(12) United States Patent
Choi

(10) Patent No.: US 8,736,657 B2
(45) Date of Patent: May 27, 2014

(54) MOBILE TERMINAL AND METHOD OF PROCESSING CALL SIGNAL THEREIN

(75) Inventor: Haeng Keol Choi, Bucheon-si (KR)

(73) Assignee: LG Electronics Inc., Seoul (KR)

( * ) Notice: Subject to any disclaimer, the term of this patent is extended or adjusted under 35 U.S.C. 154(b) by 1233 days.

(21) Appl. No.: 12/142,593

(22) Filed: Jun. 19, 2008

(65) Prior Publication Data

US 2009/0027480 A1    Jan. 29, 2009

(30) Foreign Application Priority Data

Jul. 23, 2007    (KR) .................. 10-2007-0073277

(51) Int. Cl.
H04N 7/14    (2006.01)

(52) U.S. Cl.
USPC .................. 348/14.03; 348/14.01; 348/14.02

(58) Field of Classification Search
USPC ................. 348/14.01–14.16; 715/753–758
See application file for complete search history.

(56) References Cited

U.S. PATENT DOCUMENTS

| | | | | |
|---|---|---|---|---|
| 7,096,037 | B2 * | 8/2006 | Canova et al. ............. | 455/556.1 |
| 7,568,167 | B2 * | 7/2009 | Van Dok et al. ............. | 715/789 |
| 7,917,178 | B2 * | 3/2011 | Watson ......................... | 455/563 |
| 2003/0039340 | A1 * | 2/2003 | Deshpande et al. ........ | 379/88.16 |
| 2005/0208962 | A1 * | 9/2005 | Kim ............................. | 455/550.1 |
| 2005/0210394 | A1 * | 9/2005 | Crandall et al. ............. | 715/752 |
| 2008/0003985 | A1 * | 1/2008 | Jung et al. ................... | 455/414.1 |
| 2008/0043418 | A1 * | 2/2008 | Seo .............................. | 361/683 |
| 2008/0094467 | A1 * | 4/2008 | An et al. ..................... | 348/14.02 |
| 2008/0307324 | A1 * | 12/2008 | Westen et al. ................ | 715/753 |
| 2012/0154508 | A1 | 6/2012 | Himeno | |

FOREIGN PATENT DOCUMENTS

| | | |
|---|---|---|
| CN | 1538722 A | 10/2004 |
| EP | 1 545 109 A1 | 6/2005 |
| JP | 2005-303365 A | 10/2005 |
| KR | 10-2000-0054437 A | 9/2000 |
| KR | 10-2005-0071953 A | 7/2005 |

* cited by examiner

Primary Examiner — Curtis Kuntz
Assistant Examiner — Ryan Robinson
(74) Attorney, Agent, or Firm — Birch, Stewart, Kolasch & Birch, LLP

(57) ABSTRACT

A mobile terminal including a camera configured to capture video data, a wireless communication unit configured to receive a video communication call signal and to transmit and receive real-time data with at least one other mobile terminal, a controller configured to control communication with the at least one other mobile terminal to be performed with video data and the real-time data and to prevent audio data associated with the video data from being output on the mobile terminal, when the received video communication call signal is connected, a display configured to display the real-time data and the video data received from the at least one other terminal, and an input unit configured to input the real-time data to be transmitted to the at least one other mobile terminal.

18 Claims, 13 Drawing Sheets

MOBILE TERMINAL AND METHOD OF PROCESSING CALL SIGNAL THEREIN

This application claims the benefit of the Korean Patent Application No. 10-2007-0073277, filed on Jul. 23, 2007, which is hereby incorporated by reference as if fully set forth herein.

BACKGROUND OF THE INVENTION

1. Field of the Invention

The present invention relates to a mobile terminal and corresponding method for preventing audio data associated with video data from being output on the mobile terminal, when a received video communication call signal is connected.

2. Discussion of the Related Art

Mobile terminals now provide many additional functions besides the basic call service function. For example, users can now access the Internet, play games, listen to music, perform scheduling task, take pictures, etc. using their mobile terminal. More recently, mobile terminals have been configured to receive broadcast and multicast signals which permit the user to view contents such as videos and television programs.

Mobile terminals are also configured to allow video calls where a user can see and hear the other party. However, the video call service is very limited in that the video and voice data are intermixed and sent between the calling parties regardless of where a particular user is located.

SUMMARY OF THE INVENTION

Accordingly, one object of the present invention is to address the above-noted and other problems.

Another object of the present invention is to provide a mobile terminal and corresponding method of processing a call signal, by which video communication can be performed using real-time data without audio output.

To achieve these objects and other advantages and in accordance with the purpose of the invention, as embodied and broadly described herein, the present invention provides in one aspect a mobile terminal including a camera configured to capture video data, a wireless communication unit configured to receive a video communication call signal and to transmit and receive real-time data with at least one other mobile terminal, a controller configured to control communication with the at least one other mobile terminal to be performed with video data and the real-time data and to prevent audio data associated with the video data from being output on the mobile terminal, when the received video communication call signal is connected, a display configured to display the real-time data and the video data received from the at least one other terminal, and an input unit configured to input the real-time data to be transmitted to the at least one other mobile terminal.

In another aspect, the present invention provides a mobile terminal communication method, which includes capturing video data, receiving a video communication call signal and transmitting and receiving real-time data with at least one other mobile terminal, controlling communication with the at least one other mobile terminal to be performed with video data and the real-time data and preventing audio data associated with the video data from being output on the mobile terminal, when the received video communication call signal is connected, and displaying the real-time data and the video data received from the at least one other terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 1:
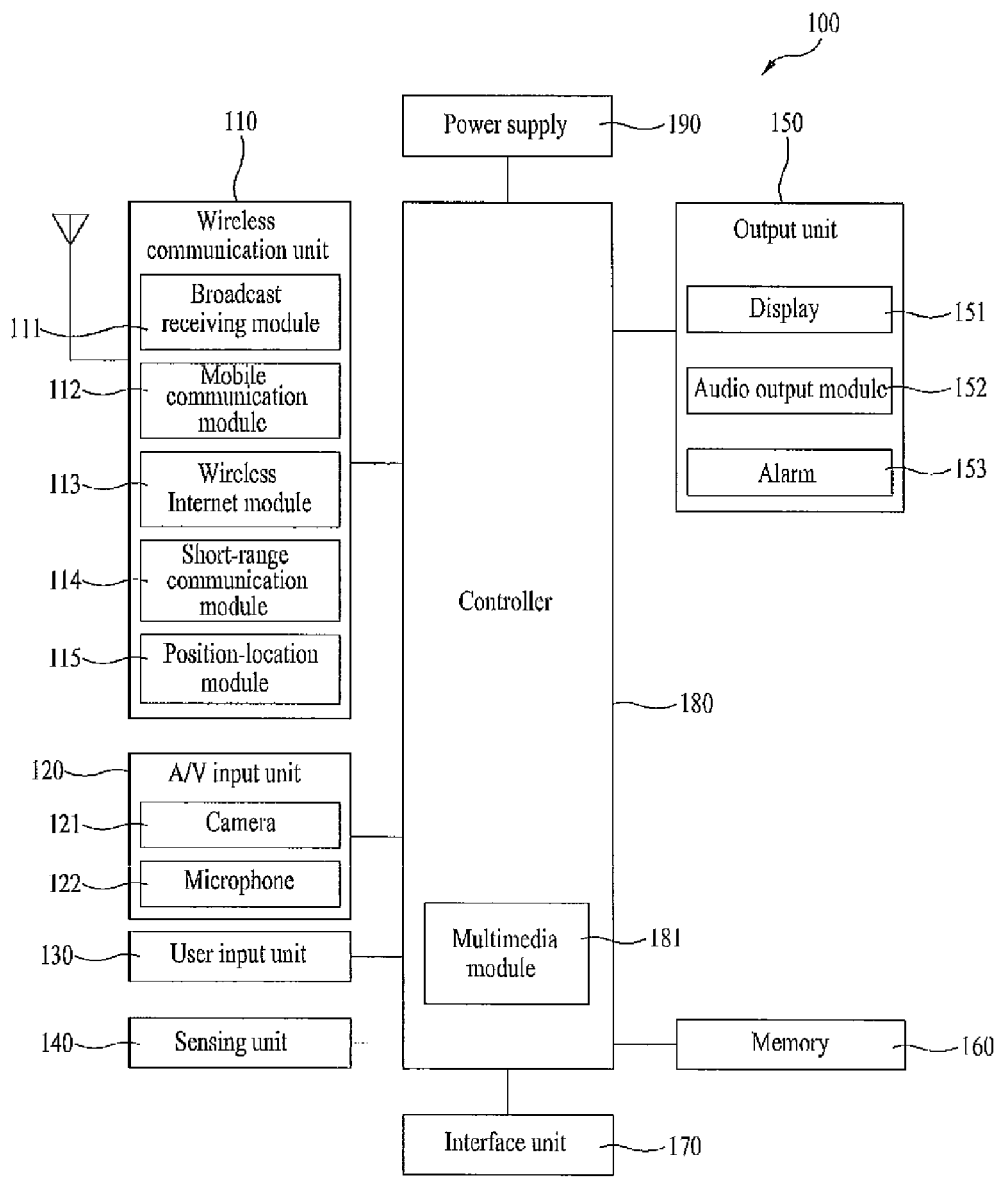
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof.

In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as phone call mode, recording mode and voice recognition. The received audio signal is then processed and converted into digital data. Also, the portable device, and in particular, the A/V input unit 120, typically includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 generally includes various components which support the output requirements of the mobile terminal 100. The mobile terminal 100 also includes a display 151 that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touchscreen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 which supports the audio output requirements of the mobile terminal 100. The audio output module 152 is often implemented using one or more speakers, buzzers, other audio producing devices, and combinations thereof. Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is commonly used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that typically controls the overall operations of the mobile terminal 100. For instance, the controller 180 performs the control and processing associated with voice calls, data communications, video calls, camera operations and recording operations. As shown in FIG. 1, the controller 180 may also include a multimedia module 181 for providing multimedia playback functions. The multimedia module 181 may be configured as part of the controller 180, or may be implemented as a separate component.

In addition, a power supply 190 provides power used by the various components for the portable device. The provided power may be internal power, external power, or combinations thereof.

Figure 2:
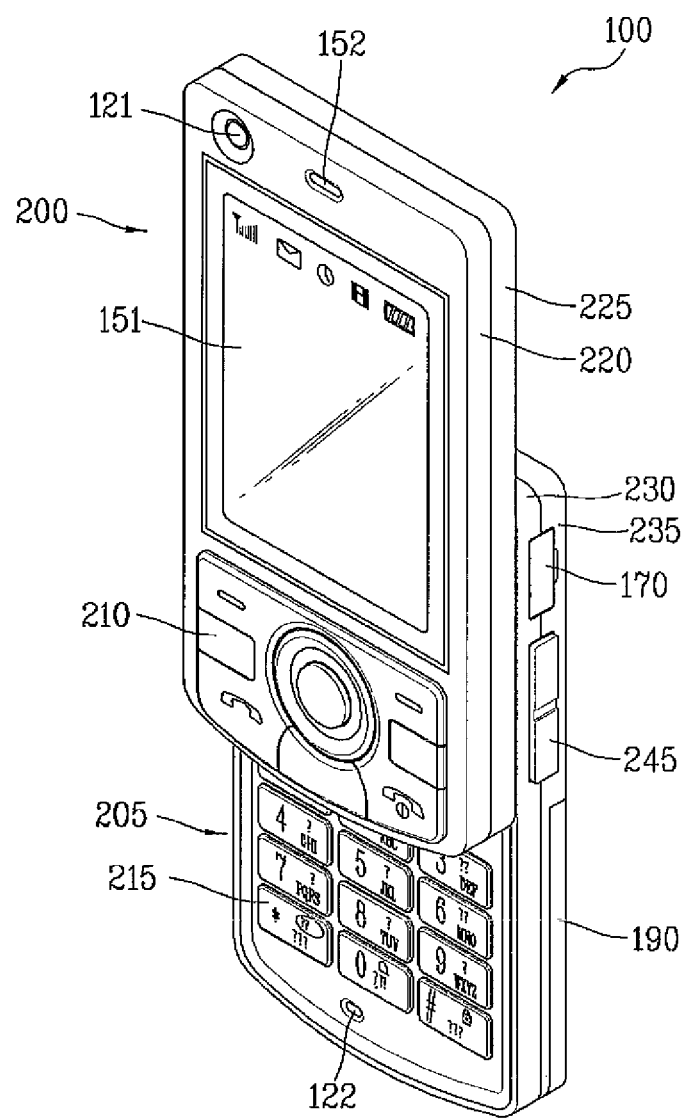
FIG. 2 is a front side view of a mobile terminal according to an embodiment of the present invention.

Next, FIG. 2 is a front side view of the mobile terminal 100 according to an embodiment of the present invention. As shown in FIG. 2, the mobile terminal 100 includes a first body 200 configured to slideably cooperate with a second body 205. The user input unit 130 described in FIG. 1 is implemented using function keys 210 and a keypad 215. The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are typically sized to receive electronic components used to support the operation of the mobile terminal 100. Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touchscreen having an underlying touchpad which generates signals responsive to user contact (e.g., finger, stylus, etc.) with the touchscreen.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 3:
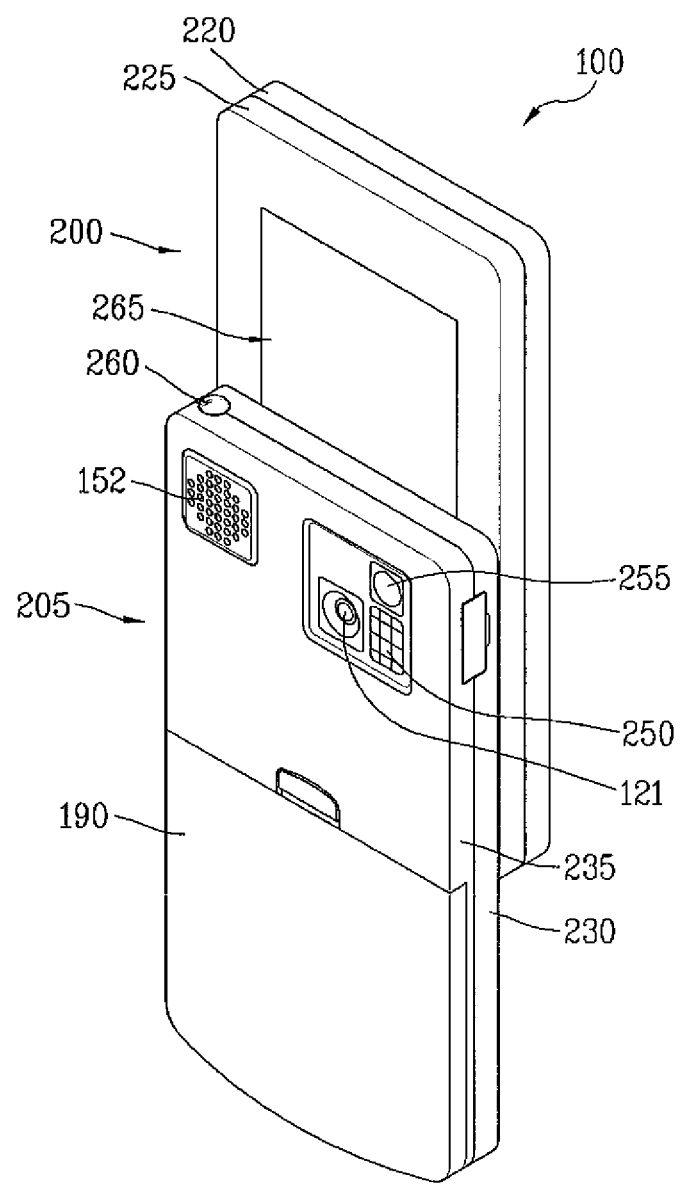
FIG. 3 is a rear side view of the mobile terminal shown in FIG. 2.

FIG. 3 is a rear side view of the mobile terminal 100 shown in FIG. 2. As shown in FIG. 3, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited.

Further, the relatively higher resolution of the camera 121 of the second body 205 (FIG. 3) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). If desired, the antenna 260 may be fixed or configured to retract into the second body 205. Further, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. In general, some or all of the components of one body may alternatively be implemented on the other body. Further, the location and relative positioning of such components may be positioned at locations which differ from those shown by the representative figures.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

A method of processing a video communication call signal using a mobile terminal 100 according to one embodiment of the present invention will now be explained.

Figure 4:
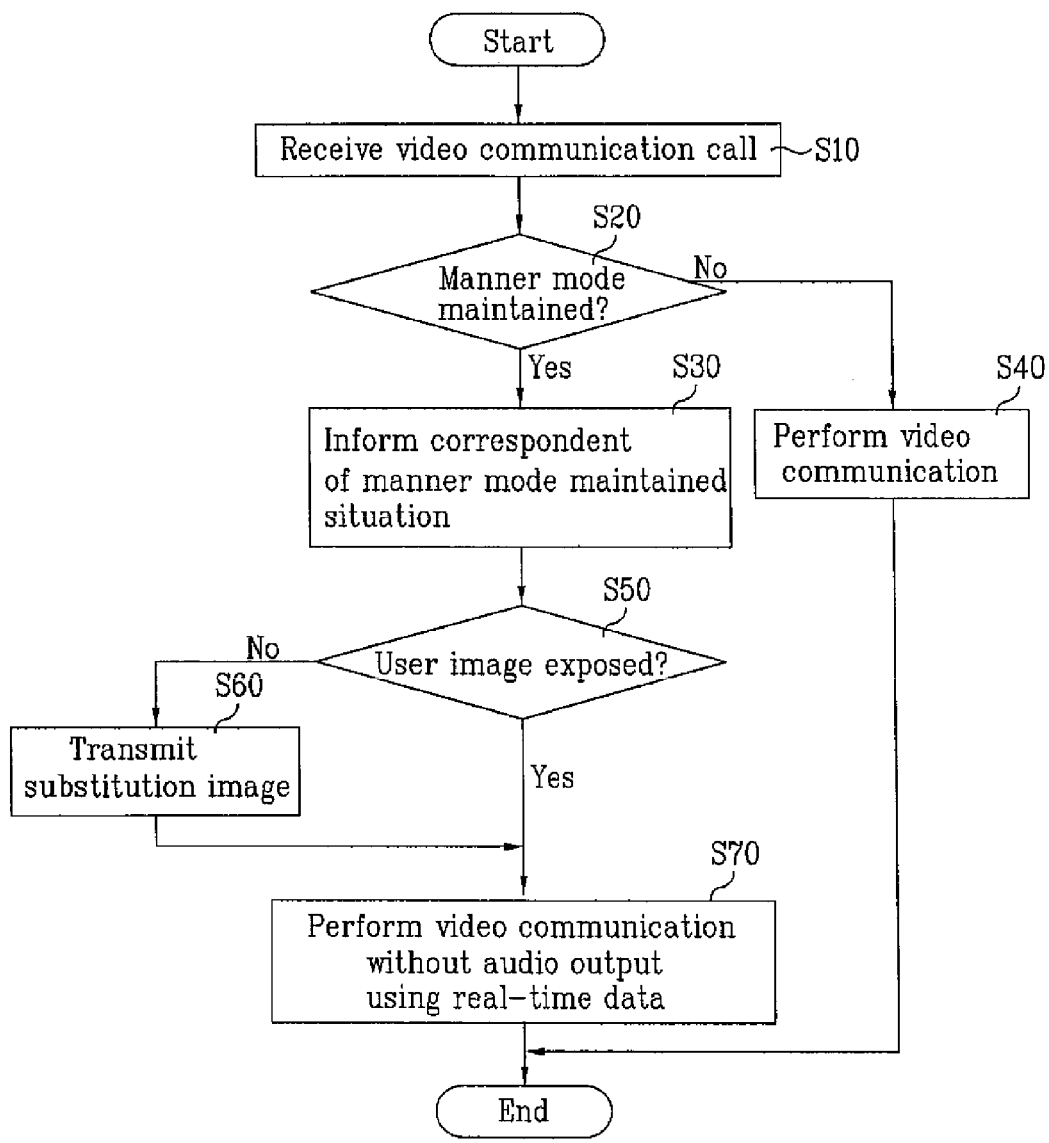
FIG. 4 is a flowchart illustrating a method of processing a call signal in a mobile terminal according to one embodiment of the present invention.

FIG. 4 is a flowchart of a method of processing a call signal in a mobile terminal according to one embodiment of the present invention. FIGS. 1-3 will also be referred to in this description.

Referring to FIG. 4, the mobile terminal 100 receives a video communication call signal through the wireless communication unit 110 (S10). The video communication call signal is receivable in a manner mode as well. In the present specification, the 'manner mode' means the received video communication call including both video and audio data is output with the video data, but the audio data is not output in a situation requiring silence. For instance, a vibration or lamp flickering can be used for indication instead of the audio signal output.

Thus, when the video communication call signal is received in the manner mode, a user is able to select whether to keep or release the manner mode (S20). For this, the controller 180 can display a screen on the display 151 for selecting whether to keep the manner mode (see FIG. 5A). If the manner mode is released in the step S20 ('NO' is selected in FIG. 5A), a normal video communication is performed (S40). In this instance, the 'normal video communication' means that communication is performed using audio input/output while a user is viewing at a displayed image.

If the manner mode is maintained in the step S20 ('YES' is selected in FIG. 5A), the controller 180 transmits information indicating that the manner mode is maintained (S30). This enables a correspondent user to recognize that video communication proceeds while the manner mode is maintained. It is also possible that step S30 is skipped in some cases. The step S20 can also be skipped if it is set as the default option, for example.

When the video communication is performed while the manner mode is maintained, a user is able to select whether or not to expose his image to the other party (S50). For example, the user may not want his image shown if he is not properly dressed. For the execution of the step S50, a screen for selecting whether to expose user's image can be displayed on the display 151.

If the user is unwilling to expose his image (No in S50), the user can instead transmit a substitution image (S60). Further, the substitution image can be set up in advance or an image stored in the memory 160 can be used. The controller 180 can also display a separate pop-up window for the selection of one of the stored images.

Once the video communication is established, the audio data included with the video data for the video conference call is not output. However, the users can still perform communication using real-time data without the audio output (S70). In the present specification, the real-time data means data transacted in real time (e.g., a chatting session).

In addition, the real-time data includes real-time transacted characters, real-time transacted multimedia messages by MMS (multimedia message service), emoticons, chatting contents, transacted data via a messenger, etc. One example of the messenger is IMS (IP multimedia subsystem) messenger. The chatting can also include video chatting.

According to one embodiment of the present invention, the transmission and reception of the real-time data is carried out via the IP (Internet Protocol) based PS (packet service) network or 3GPP based CS (circuit service) network. For instance, real-time data transacted via IMS (IP multimedia subsystem) messenger can be transmitted/received via the PS (packet service) network.

In addition, the real-time data transacted via the video chatting can be transmitted/received via the CS (circuit service) network. In particular, when the real-time data area transacted via the CS network, it is unnecessary to establish a separate server, thus saving network resources and cost.

Next, a method of performing video communication using real-time data without audio output will be explained with reference to FIGS. 5(a)-5(c).

Figure 5:
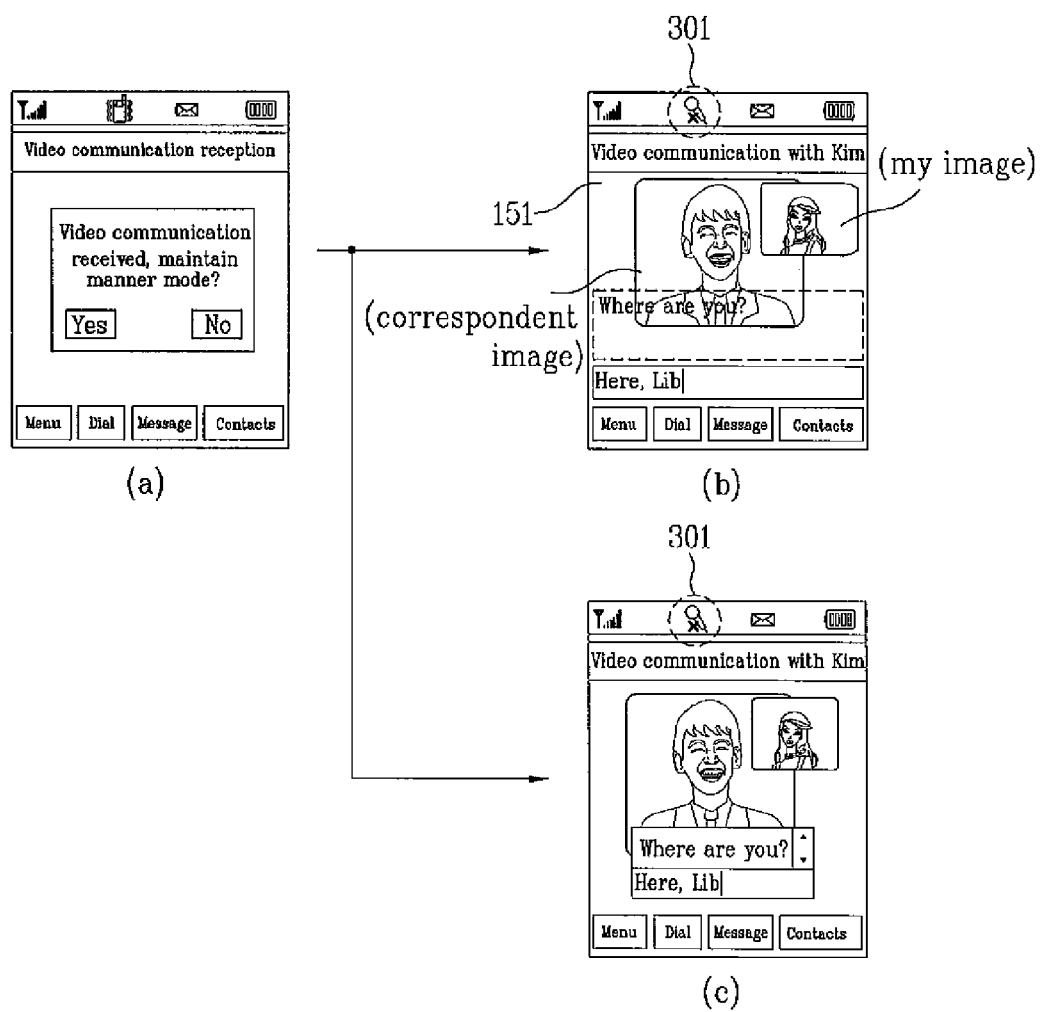
FIGS. 5(a) to 5(c) are overviews illustrating real-time data being input into a mobile terminal according to an embodiment of the present invention.

As shown, if 'YES' is selected in FIG. 5(a), the controller 180 can display a screen shown in FIG. 5(b) or 5(c). In FIG. 5(b), the transmitted or received real-time data is displayed by being overlapped with a correspondent image. In FIG. 5(c), the controller 180 displays an input window on a space separate from a displayed image. Thus, as shown in FIGS. 5(b) and 5(c), the chatting service is performed using real-time data without audio output.

In addition, the chatting service enables characters, data and emoticons to be transacted between users. Further, the data stored in the memory 160 can be used as the real-time data. For instance, emoticons, common-use words and the like can be stored in the memory 160 in advance.

Further, when the stored real-time data is used, the user does not have to operate the user input unit 130 to input the real-time data such that the real-time data can be conveniently transmitted. Alternatively, the real-time data can be inputted via key manipulation of the user input unit 130. In particular, when the user input unit 130 exists as a touchscreen configuration, the user input unit 130 can be operated by touching the display 151.

In addition, and as shown in FIGS. 5(b) and 5(c), the controller 180 is able to inform a user of the manner mode by displaying an icon 301 for a video communication manner mode on the display 151.

Figure 6:
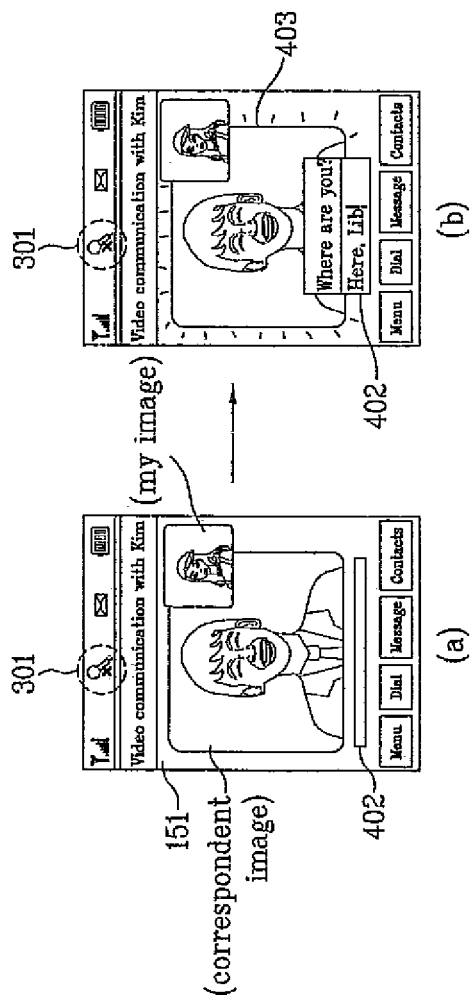
FIGS. 6(a) and 6(b) are overviews illustrating highlighting an image of a user inputting real-time data according to an embodiment of the present invention.

Now FIGS. 6(a) and 6(b) will be referred to illustrate an example of a method of inputting real-time data. As shown in FIG. 6(a), the controller 180 displays an input window 402 that the user can input real-time data into. That is, the input window 402 is a window displayed on the display 151. The user can also view data entered by the other party in the input window 402. Thus, the users can perform a real-time chatting session with each other.

Further, FIG. 6(a) illustrates the input window 402 in an inactivated state (i.e., the user has not entered any data). FIG. 6(b) illustrates the user entering data into the input window 402. In addition, as shown in FIG. 6(b), the controller 180 also highlights the image of the user that has entered the data into the input window 402. That is, in FIG. 6(b), the controller 180 flashes a light 403 on a boundary of the correspondent user image to identify that the user is typing data into the input window 402. Thus, the users can easily see who entered the data into the input window 402.

Figure 7:
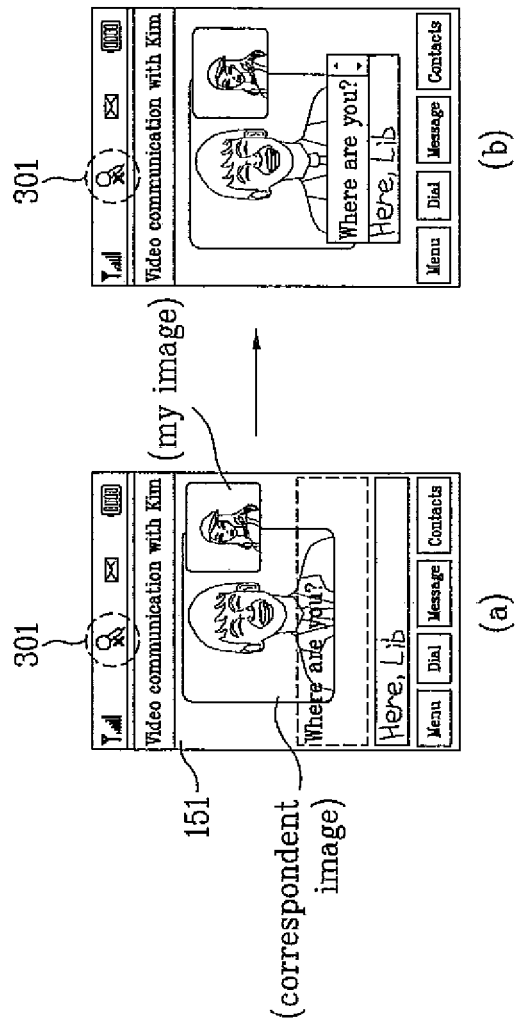
FIGS. 7(a) and 7(b) are overviews illustrating inputting real-time data via handwriting on a touchscreen according to an embodiment of the present invention.

FIGS. 7(a) and 7(b) are overviews illustrating another example of inputting real-time data. As shown in FIG. 7(a), the status of transmitting or receiving real-time data is displayed by being overlapped with a correspondent user image. FIG. 7(b) illustrates an input window being displayed on a space separate from a displayed image.

Further, and as shown in FIGS. 7(a) and 7(b), the display 151 includes a touchscreen such that the user can input real-time data to a specific area of the display 141 by handwriting on the touchscreen. In particular, the controller 180 is able to recognize the user's handwriting written on the specific area of the display unit 151. That is, the specific area is the prescribed area provided for real-time data input.

Figure 8:
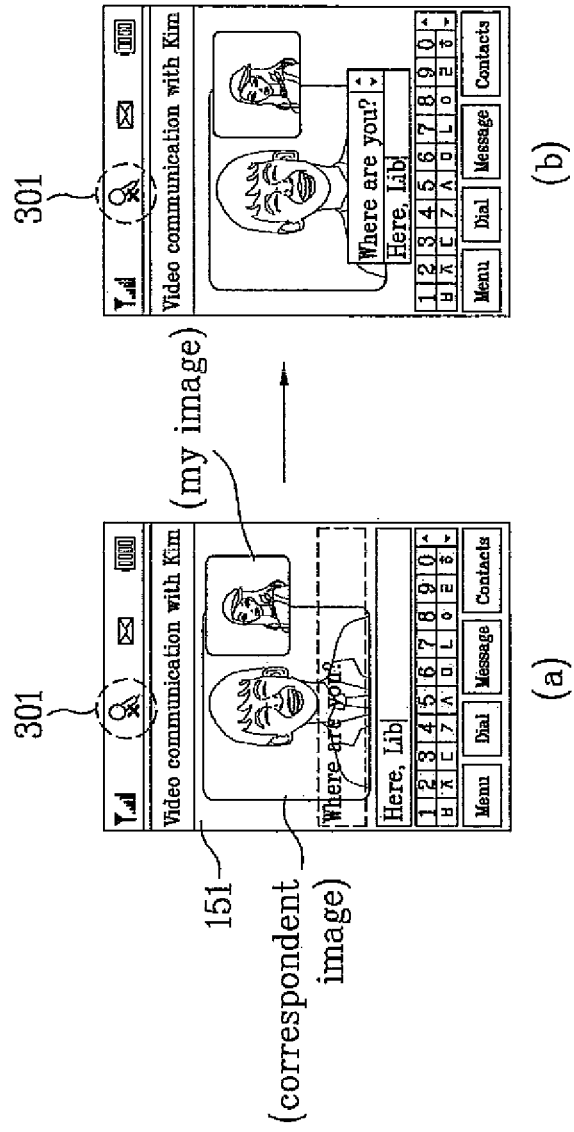
FIGS. 8(a) and 8(b) are overviews illustrating inputting real-time data using a keypad according to an embodiment of the present invention.

FIGS. 8(a) and 8(b) are overviews illustrating yet another example of inputting real-time data. In more detail, FIG. 8(a) illustrates a status of transmitting or receiving real-time data being displayed by being overlapped with a correspondent user image, and FIG. 8(b) illustrates an input window being displayed on a space separate from a displayed image (similar to FIGS. 7(a) and 7(b)).

FIGS. 8(a) and 8(b) also illustrate that a user can input real-time data via a keypad displayed in a specific area of the display 151. That is, the user can touch the displayed keypad to input information into the chatting or input window. Further, the data input into the chatting or input window can be transmitted as soon as the data is input or can be transmitted only when a particular key is selected such as an Enter key.

Figure 9:
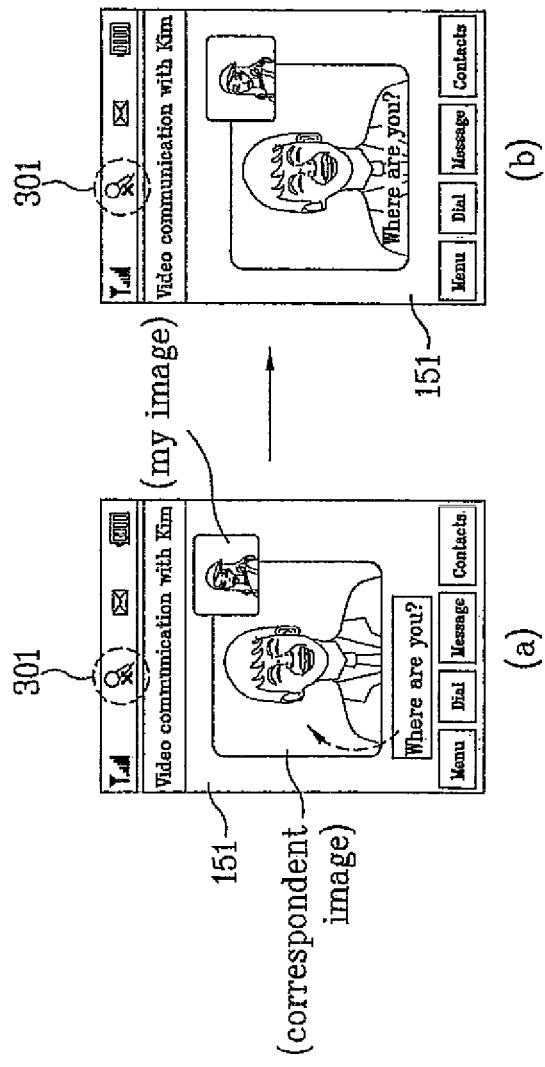
FIGS. 9(a) and 9(b) are overviews illustrating dragging input real-time data over an image of a user to transmit the real-time data to the other party according to an embodiment of the present invention.

FIGS. 9(a) and 9(b) are overviews illustrating a user dragging input text onto an image of a user. In more detail, when the contents of input real-time data are dragged to a correspondent user image via a touch (see FIG. 9(a)), the dragged contents of the real-time data can be displayed by being overlapped with the correspondent user image (see FIG. 9(b)). In this instance, the dragged contents of the real-time data are transmitted to a correspondent user.

Figure 10:
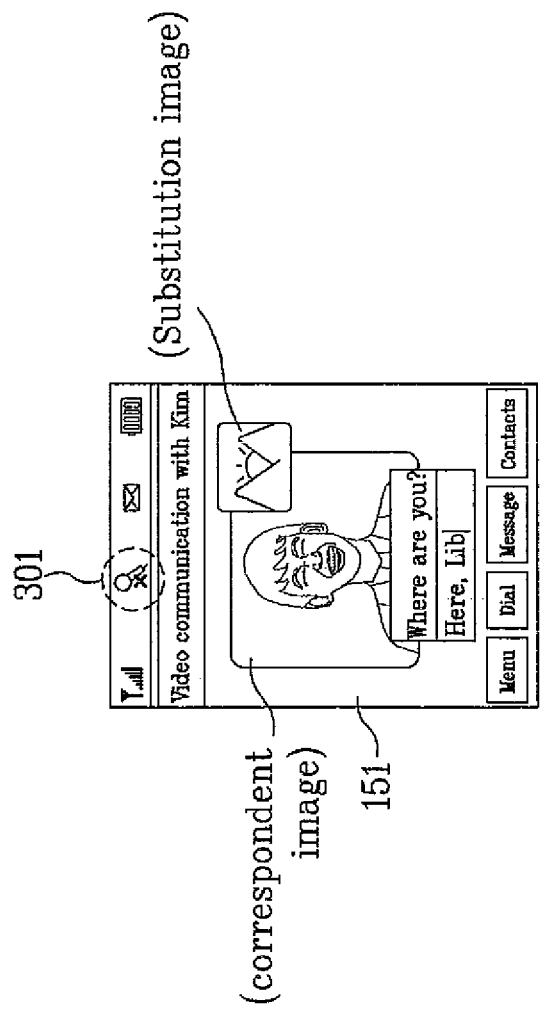
FIG. 10 is an overview illustrating a substitute image being displayed according to an embodiment of the present invention.

In addition, as discussed above, the user can have their image transmitted to the other party when performing video communication via the camera 121. Alternatively, the user may designate a substitution image be transmitted to the other party. FIG. 10 illustrates a substitute image being transmitted rather than the user's own image.

Figure 11:
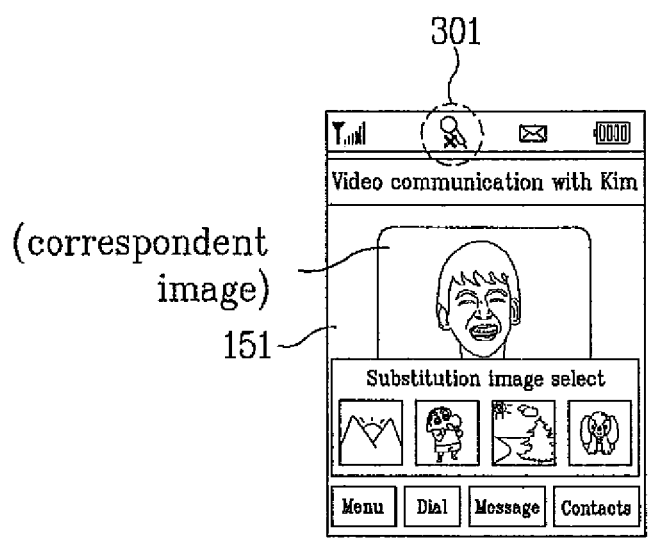
FIG. 11 is an overview illustrating a selection of a substitute image according to an embodiment of the present invention.

As mentioned above, the substitution image can be set up in advance or can include an image selected from a plurality of images stored in the memory 160. FIG. 11 illustrates this concept. That is, as shown in FIG. 11, the controller 180 displays a pop-up window for selecting one of the stored images on the display 151.

Figure 12:
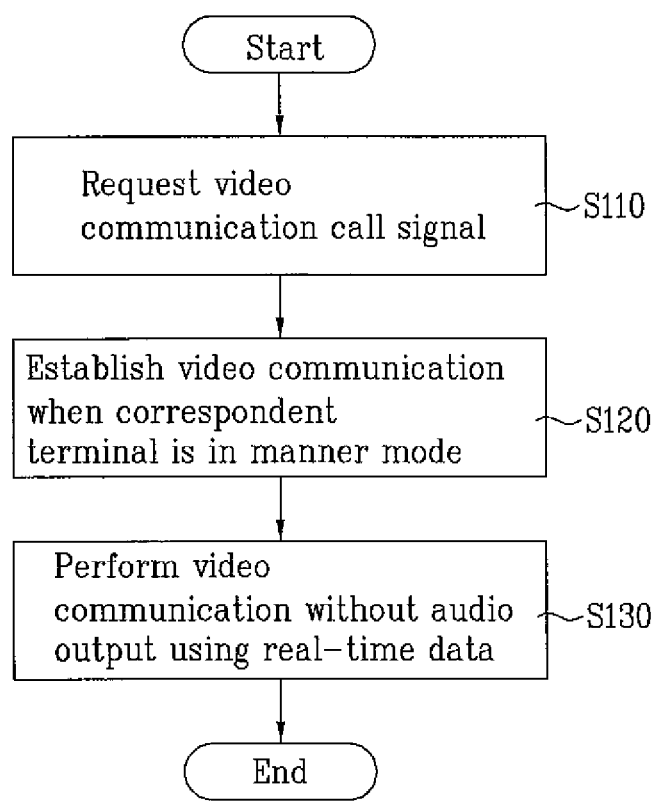
FIG. 12 is a flowchart illustrating a method of processing a call signal in a mobile terminal according to another embodiment of the present invention.

FIG. 12 is a flowchart illustrating a method of processing a call signal in a mobile terminal according to another embodiment of the present invention. In this embodiment, the mobile terminal 100 receives an incoming video call from another user (rather than placing the video call).

Figure 13:
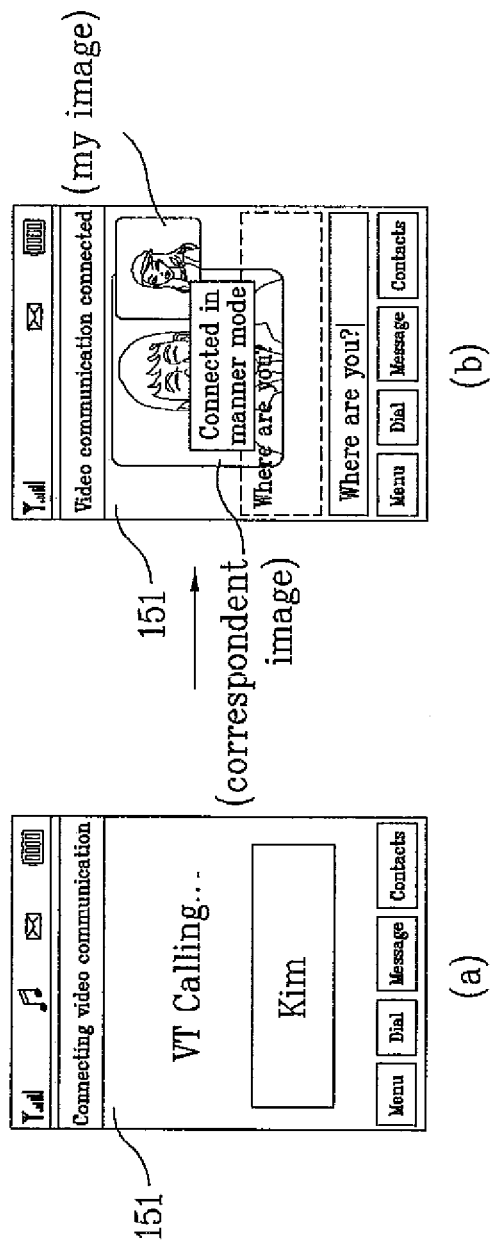
FIGS. 13(a) and (b) are overview illustrating the method shown in FIG. 12.

As shown in FIG. 12, a video communication call signal request is received via the wireless communication unit 110 (S110). FIG. 13(a) illustrates a screen shot of the display 151 when receiving such an incoming call. Then, when the incoming video call is accepted, the video communication is established between the users (S120). The video communication is performed in the manner mode such that the real-time data can be received and transmitted, but the audio data is not output on the mobile terminal. Further, as shown in FIG. 13(b), the controller 180 is able to display information indicating to the user that the correspondent terminal is connected in the manner mode.

In addition, in yet another embodiment, when the manner mode option is executed, a voice signal of a user of the mobile terminal is converted into text and displayed on the display of the mobile terminal of the user. That is, the mobile terminal includes the appropriate voice recognition software that converts the user's voice into text data.

As mentioned in the foregoing description, when a correspondent terminal connects the video communication call in the manner mode, the controller 180 enables the video communication to be performed using real-time data. That is, the controller 180 allows the video to be displayed and the real-time data to be input and received, but prevents the audio data from being output.

In addition, when the video communication is performed via the video communication call signal request, various methods of receiving the video communication call signal are applicable. For instance, the realtime data inputting method, the real-time data transmitting method, the example of the real-time data, a transmission network of the real-time data and the like can be identically or similarly applicable.

Meanwhile, according to one embodiment of the present invention, if a manner mode is operated in video communication, a transmitting or receiving side terminal can set whether to use a user input unit. In this instance, data inputted via the user input unit can be transmitted or received using the H324 User Data Applications Protocol, for example.

Further, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof. Further, the mobile terminal may be implemented using a variety of different types of terminals such as mobile phones, user equipment, smart phones, computers, digital broadcast terminals, personal digital assistants, portable multimedia players (PMP) and navigators.

Accordingly, embodiments of the present invention provide several advantages.

First of all, the present invention enables video communication without audio output in a situation that requires silence. Secondly, the present invention enables communication to be performed using real-time data in performing video communication.

It will be apparent to those skilled in the art that various modifications and variations can be made in a mobile terminal capable of performing video communication using real-time data according the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a camera;
   a wireless communication unit configured to receive a video communication call signal and to transmit and receive real-time data with at least one other mobile terminal;
   a controller configured to establish a manner mode to automatically prevent audio data associated with video data from being output on the mobile terminal during video communication and to perform video communication with the at least one other mobile terminal using video data and the real-time data after establishing the manner mode;
   a display configured to display the real-time data and the video data received from the at least one other terminal; and
   an input unit configured to input the real-time data to be transmitted to the at least one other mobile terminal,
   wherein the controller is further configured to activate an input mode for inputting the real-time data by displaying an input window such that the real-time data can be input in the input window, to transmit input real-time data to said at least one other terminal when the real-time data input in the input window is dragged over an image of a user of said at least one other mobile terminal, and to convert a voice signal of a user of the mobile terminal into text and to display the text on the display of the mobile terminal.

2. The mobile terminal of claim 1, wherein the real-time data comprises at least one of real-time transacted characters, real-time transacted multimedia messages (MMS), chatting contents, and real-time emoticons.

3. The mobile terminal of claim 1, further comprising:
   a memory configured to store the real-time data input on the mobile terminal,
   wherein the controller is further configured to control the wireless communication unit to transmit the real-time data stored in the memory to said at least one other mobile terminal.

4. The mobile terminal of claim 1, wherein the display includes a touchscreen configured to enable information to be input by touching the touchscreen.

5. The mobile terminal of claim 4, wherein the controller is further configured to recognize handwriting written on the touchscreen or a touching of keys included in a keypad displayed on the touchscreen as an input of the real-time data.

6. The mobile terminal of claim 1, wherein the controller is further configured to highlight the input window when the real-time data is input.

7. A mobile terminal comprising:
   a camera;
   a wireless communication unit configured to receive a video communication call signal and to transmit and receive real-time data with at least one other mobile terminal;
   a controller configured to perform video communication with the at least one other mobile terminal using video data and the real-time data and to prevent audio data associated with the video data from being output on the mobile terminal when the video communication is established;
   a display configured to display the real-time data and the video data received from the at least one other terminal; and
   an input unit configured to input the real-time data to be transmitted to the at least one other mobile terminal,
   wherein the controller is configured to activate an input mode for inputting the real-time data by displaying an input window such that the real-time data can be input in the input window, and
   wherein the controller is further configured to transmit input real-time data to said at least one other terminal when the real-time data input in the input window is dragged over an image of a user of said at least one other mobile terminal.

8. The mobile terminal of claim 1, wherein the controller is further configured to highlight an image of a user inputting the real-time data when the user is inputting the real-time data.

9. The mobile terminal of claim 1, wherein the input unit is further configured to automatically provide a manner mode option to allow a user to select whether to maintain the manner mode when the video communication is connected in the manner mode.

10. A mobile terminal communication method, the method comprising:
   establishing a manner mode to automatically prevent audio data associated with video data from being output on the mobile terminal during video communication;
   receiving a video communication call signal and transmitting and receiving real-time data with at least one other mobile terminal;
   performing video communication with the at least one other mobile terminal using video data and the real-time data after establishing the manner mode;
   displaying real-time data and the video data received from the at least one other terminal;
   activating an input mode for inputting the real-time data by displaying an input window such that the real-time data can be input in the input window; and
   transmitting input real-time data to said at least one other terminal when the real-time data input in the input window is dragged over an image of a user of said at least one other mobile terminal, wherein a voice signal of a user of the mobile terminal is converted into text and displayed on a display of the mobile terminal of the user.

11. The method of claim 10, wherein the real-time data comprises at least one of real-time transacted characters, real-time transacted multimedia messages (MMS), chatting contents, and real-time emoticons.

12. The method of claim 10, further comprising:
storing the input real-time data in a memory of the mobile terminal,
wherein the performing step transmits the real-time data stored in the memory to said at least one other mobile terminal.

13. The method of claim 10, further comprising:
inputting information on the mobile terminal by touching a touchscreen included with the mobile terminal.

14. The method of claim 13, further comprising:
recognizing handwriting written on the touchscreen or a touching of keys included in a keypad displayed on the touchscreen as an input of the real-time data.

15. The method of claim 10, further comprising:
highlighting the input window when the real-time data is input.

16. A mobile terminal communication method, the method comprising:
receiving a video communication call signal and transmitting and receiving real-time data with at least one other mobile terminal;
performing video communication with the at least one other mobile terminal using video data and the real-time data and automatically preventing audio data associated with the video data from being output on the mobile terminal when the video communication is established during a manner mode;
displaying real-time data and the video data received from the at least one other terminal;
activating an input mode for inputting the real-time data by displaying an input window such that the real-time data can be input in the input window; and
transmitting input real-time data to said at least one other terminal when the real-time data input in the input window is dragged over an image of a user of said at least one other mobile terminal.

17. The method of claim 10, further comprising:
highlighting an image of a user inputting the real-time data when the user is inputting the real-time data.

18. The method of claim 10, further comprising:
automatically providing a manner mode option to allow a user to select whether to maintain the manner mode when the video communication is connected in the manner mode.

* * * * *